United States Patent [19]

Papenfuss et al.

[11] 3,925,094

[45] Dec. 9, 1975

[54] DYESTUFF PREPARATIONS AND PROCESS FOR THEIR MANUFACTURE

[75] Inventors: Theodor Papenfuss; Rolf Rehberg, both of Niederhofheim, Taunus; Ernst Spietschka, Oberauroff, all of Germany

[73] Assignee: Hoechst Aktiengesellschaft, Frankfurt am Main, Germany

[22] Filed: Apr. 9, 1973

[21] Appl. No.: 348,865

Related U.S. Application Data

[63] Continuation of Ser. No. 134,472, April 15, 1971, abandoned.

[30] Foreign Application Priority Data

Apr. 16, 1970 Germany.......................... 2018169

[52] U.S. Cl........... 106/288 Q; 106/308 M; 106/241
[51] Int. Cl.$^2$........................................ C09B 57/00
[58] Field of Search........ 106/288 Q, 308 M, 308 F, 106/308 Q, 241, 309

[56] References Cited

UNITED STATES PATENTS

| | | | |
|---|---|---|---|
| 3,635,745 | 1/1972 | Rentel et al. | 106/288 Q |
| 3,653,936 | 4/1972 | Wolf et al. | 106/288 Q |

*Primary Examiner*—Herbert Levine
*Assistant Examiner*—James W. Hellwege
*Attorney, Agent, or Firm*—Curtis, Morris & Safford

[57] ABSTRACT

Pigment preparations of triphenylmethane dyestuffs which are coated by resins such as natural resins, their oxidation products as well as synthetic resins and the modification products thereof. The pigment preparations have a high tinctorial strength, clear shades and can easily be dispersed in printing varnishes. Moreover, they have excellent properties in preparing brightened black printing inks on a soot basis. A process for preparing the resinated pigment is also disclosed.

5 Claims, No Drawings

DYESTUFF PREPARATIONS AND PROCESS FOR THEIR MANUFACTURE

This application is a continuation of our parent application Ser. No. 134,472 filed Apr. 15, 1971 now abandoned.

The present invention relates to dyestuff preparations and a process for their manufacture.

It has already been proposed that derivatives of water-insoluble triphenyl-methane dyestuffs can advantageously be used for the manufacture of blue, green and, above all, black printing inks. In comparison to the mineral or partially mineral blue and green pigments also used, they are distinguished by a considerably higher tinctorial strength, brilliant shades and better properties with regard to their technical use, such as dispersibility, softness of grain and brightening degree with black color mixtures.

These triphenyl methane derivatives mostly belong to the series of the arylated resanilines or viridines, which represent brilliant intense blue or green dyestuffs in the form of their salts. As they are insoluble in an aqueous medium at any pH whatsoever it has not yet been possible to convert these dyestuff salts into pigments suitable for technical use in the industry of printing dyestuffs.

However, they could be used as printing pigments after it has become possible to obtain products which are soluble in alkaline agents and insoluble in acids, by monosulfonation of the triphenyl-methane color bases. These properties permitted a fine dispersion of the monosulfonated color bases to yield pigments of high tinctorial strength and brilliance by dissolving the products in an alkaline medium and by precipitating them with an acid under exactly controlled conditions of temperature, stirring and time.

However, the so-obtained aqueous press cakes of the finely dispersed sulfonic acid dyestuffs can not be freed from water by drying without the loss of their grain softness. Instead, reagglomeration of the pigments takes place which leads to hard grains and loss of tinctorial strength.

In order to be able to use these dyestuffs as pigments in the graphic industry the aqueous phase cakes are subjected to a "flush process" in which they are kneaded with varnish; the binder molecules almost completely displace and separate the water adhering to the pigment surface, thus avoiding the drying process which leads to the formation of agglomerates, so that the water can be eliminated mechanically. A vacuum kneading process must follow to obtain dyestuffs that are completely free from water, which is a prerequisite for the use in printing inks. In spite of the great technical expenditure in their manufacture, the pigment preparations are used in the graphic industry in large quantities because of their excellent brilliance and their brightening effect unequalled so far in the manufacture of black printing inks on a soot basis.

Besides the great technical expenditure, a considerable drawback of these dyestuff flush-pastes in their low pigment content which must generally not exceed a maximum of 40% since otherwise difficulties in processing are encountered. The large binder portion may also lead to difficulties in establishing a well-balanced and optimum printing ink recipe and naturally prevents the general use on a large scale. Thus, for example, the usual flush plates on linseed oil basis, which are used in offset and book printing inks are not suitable for heat-set colors.

Many attempts have therefore been made to manufacture more concentrated preparations of these triphenyl-methane derivatives which can be used in a large field of application. It has been achieved only recently (cf. Belgian Patent No. 737 060) to bring about fine dispersion of the color base-monosulfonic acids in the presence of acid resins or their modification products. There are obtained pigment powder preparations for a large field of application, which have a high pigment content and can be dried without formation of coarse grains. In spite of this important advantage there remained some difficulties as, also in this case, the synthesized color base must be isolated in bulk and dried, monosulfonated in a second operation step and finely dispersed by redissolving it in a third operation step, this process being thus less economic and the prices of the products being too high.

The present invention provides novel brilliant pigment preparations of great tinctorial strength and suitable for technical application, made from resins and triphenyl-methane dyestuff salts of the general formula

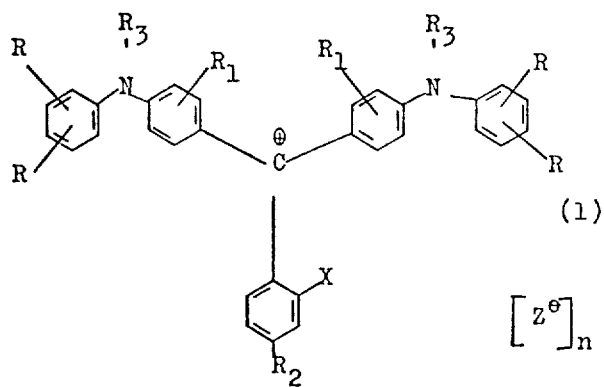

(1)

in which
R represents a hydrogen or halogen atom; an alkyl group, preferably containing from 1 to 4 carbon atoms, an alkoxy group, preferably containing from 1 to 4 carbon atoms, a nitrils, carboxylic acid ester, carbonamido, nitro, amino, alkylamino, phenylamino, acylamino, optionally substituted phenyl group and/or a sulfonamido group, and two radicals, R in o-position may represent together a condensed phenyl ring, $R_1$ represents a hydrogen atom, a methyl and/or ethyl group, in which case $R_1$ may represent together with a radical R also a direct bond, $R_2$ represents a hydrogen or halogen atom, an amino, phenylamino or naphthylamino group which may be substituted by one or two radicals which have the meaning of R, $R_3$ represents a hydrogen atom, a methyl and/or ethyl group, X represents a hydrogen or halogen atom or a radical $-SO_3^\ominus$ or $-COO^\ominus$, Z represents an anion and n is zero or the integer 1, n being zero if X represents one of the above-mentioned anions and n being 1 if X represents a hydrogen or halogen atom.

This invention relates furthermore to a simple and very economic process for their preparation wherein triphenylmethane compounds of the general formula

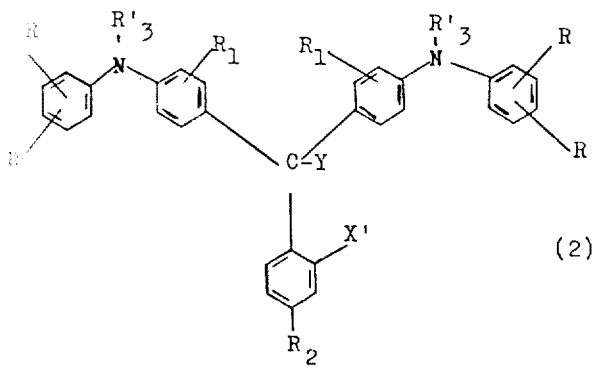

in which

R, $R_1$ and $R_2$ are defined as above, $R'_3$ represents a hydrogen atom, a methyl and/or ethyl group, X' represents a hydrogen or halogen atom or a radical —$SO_3H$ or —COOH and Y represents a hydroxy group, and X' and Y may be together also a —$SO_2$—O or —CO—O group and one of the radicals $R_3'$ and Y may also be a direct bond with the ring A or B, one ring being a quinonoidal system, are dissolved in an aromatic amine which is liquid below 50°C, together with such resins which are soluble in aromatic amines and can again be precipitated by the addition of aqueous acids, the mixture so obtained is mixed with an aqueous solution of an acid at temperatures within the range of from —10° to +50°C and the precipitated pigment preparations are isolated.

The triphenyl-methane compounds used as starting compounds may be present, as it is shown in the above formula (2), in the form of their carbinols (Y = —OH), lactones or sultones

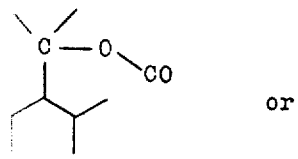 or 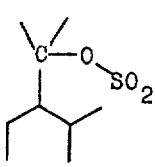

or in their anhydro form

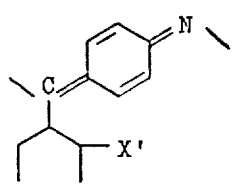

The starting compounds used according to the invention may be manufactured according to the following known methods:

1. By the reaction of rosanilines with primary aromatic amines in the presence of acid catalysts (benzoic acid), wherein an amine solution of the color bases (carbinol or anhydro form) suitable for carrying out the preparation is directly obtained (cf. Fierz-David, Künstl. organische Farbstoffe 1926, page 262 and BIOS Final Report 1433, page 30 et seq.);

2. by the conversion of amine solutions of the color base-tetrachloroaluminates, which can be obtained according to German Pat. Nos. 1 098 652, 1 161 370 and 1 161 371 or Belgian Patent No. 718 410, by reacting 4,4',4''-trichlorotrityl or 4,4'-dichlorotrityl-tetrachloroaluminates with primary aromatic amines, by means of aqueous alkali metal hydroxide solution into the amine solution of the free color bases (carbinol or anhydro form). The solution of the triphenyl-methane base thus obtained in the amine used in excess for the halogen exchange can be directly used as preparation solution;

3. by the reaction of diphenyl amines with aromatic carboxylic acids or their functional derivatives (for example benzotrihalides, anhydrides or acid halides) in the presence of acid catalysts and subsequent treatment with an aqueous alkali metal hydroxide, whereupon also solutions of the color bases (carbinol or lactone or sulfone form) to be prepared are obtained in the aromatic amine used in excess.

Although it is particularly advantageous to use the color base solutions thus manufactured, directly for the preparation, in which the aromatic amine used in excess and reacting in a stoichiometrical ratio represents, in any case, the solvent, it may be more suitable in special cases to isolate the color base, optionally with simultaneous purification, and to carry out the pigment formation in another amine.

The isolation of the color bases may be carried out, for example, by vacuum distillation of the volatile bases contained in the dyestuff melt at temperatures of about 150°C and grinding the remaining melt (cf. BIOS Final Report, 1433, page 32).

The crude dyestuffs present in the dyestuff melt may be purified for example by a treatment with solvents of the color bases converted with sulfuric acid into their salts (cf. German Pat. No. P 19 19 724.1) and by subsequent preparation of a color base-amine solution in such a manner that the purified dyestuff sulfate is suspended in an aromatic amine, the color base is set free with an aqueous alkali metal hydroxide solution while stirring, the color base dissolves in the amine and the aqueous phase is separated subsequently (cf. BIOS Final Report 1433, page 32).

The intermediate isolation of the color base may be advantageous, for example if the amine used as a reaction component is solid at temperatures below 50°C.

An intermediate purification may be suitable if the dyestuff obtained by the synthesis is contaminated by colored compounds insoluble in acids since, otherwise, in some cases pigment preparations are obtained which are too dull, have a poor tinctorial strength and thus are useless.

Suitable aromatic amines in accordance with the invention are those which are basic enough to form salts with dilute aqueous acids, that are, at least partially, soluble in water, and those which have a solidification point of less than 50°C, such as aniline, the toluidines, xylidines, selected halogenoanilines and halogenotoluidines and naphthyl amines, preferably aniline, o- and m-toluidine, θ- and m-chloroaniline, vic. m-xylidine, asymmetrical m-xylidine, 6-chloro- and 4-chloroo-toluidines and 5,6-dichloro-2-aminotoluene.

By "resins" there are to be understood natural resins, for example balsam resin, root or tall resin, their oxidation products formed by exposure to air and mixtures thereof, as well as synthetic resins, for example hydrocarbon resins.

"Modification products" are herein meant to be known derivatives of the above compounds which have already been described in the art (for example, W. Sandermann, "Naturharze, Terpentinoel, Tallsel") and which are the following:

1. Oxidized resin acids,
2. Hydrogenated resin acids (cf. U.S. Pat. No. 2 174 651)
3. Dimerized resin acids (cf. German Pat. No. 564 897 and U.S. Pat. No. 2,124,675),
4. Disproportioned resin acids,
5. Acid resin esters with mono-, di- and/or polyfunctional alcohols or mixtures thereof or products obtainable by the reaction of resin acids with epoxy resins or ethylene oxide (cf. W. Sandermann, i.e. page 217),
6. Aldehyde-modified resins obtained by the addition reaction of, for example, formaldehyde or other suitable aldehydes with resins (cf. German Pat. No. 742 209) or further condensates of the aldehyde-modified resins with phenols or formaldehyde and phenols (cf. U.S. Pat. Nos. 1,658,828 and 2,007,983) and reaction products obtained by oxonation or hydroformylation of resins (cf. U.S. Pat. No. 2,327,066),
7. Acid maleinate resins and other products obtained by the reaction of dienes with resins, as they are described, for example, by Sandermann (l.c., page 240), for example adducts of levopimaric acid-maleic acid anhydride, addition products of maleic or fumaric acid with resins or resins or resin esters manufactured by means of acrylic acid,
8. Phenol-modified resins which are obtained under the action of strongly acid or acid-separating catalysts by the addition reaction of phenols with resins and which contain not only free acid groups but also phenolic hydroxyl groups which may (partially) be esterified (cf. German Pat. Nos. 581 596, 582 846, 652 602 and 536 170, French Pat. No. 923 602).
9. Adducts of resin with hydrocarbons containing double bonds which have been obtained in the presence of strongly acid compounds, such as boron trifluoride. Hydrocarbons of this kind are for example butadiene, isoprene, isobutene, cyclopentadiene, styrene, methyl and vinyl styrene, cumarone, indene and carbazole (cf. U.S. Pat. Nos. 2,527,577, 2,527,578, and 2,532,120, German Patent No. 578 039 and French Pat. No. 958 920),
10. Resin-modified acid phenol resins, manufactured by the reaction of resins with phenolaldehyde, preferably phenol, alkyl phenol or aralkyl phenol-formaldehyde condensates or mixtures thereof. The manufacture of the phenol-formaldehyde-condensates may have been carried out under the action of alkaline condensation agents, preferably those having more than 1 mol of aldehyde per mol of phenol and under the action of acid condensation agents having less or more than 1 mol of formaldehyde. It may have also been possible to have the resins condensed with phenols, aldehydes and catalysts together (cf. German Pats. No. 254 411, 269 959 and 281 939).,
11. Acid resin condensates with xylene formaldehyde resins (cf. German Pat. No. 815 544),
12. Resin condensates with terpene-maleic resins, which are known, for example, under the name of Pertrex (registered trade mark) (cf. E. R. Littmann, Ind. Engng. Chem. 28, 1150 (1936).

For the manufacture of dyestuff preparations in accordance with the invention there may be used not only dyestuffs and resins alone but also dyestuff and/or resin mixtures, the yield being the same or even better.

The addition of the resins to the color base solution may be carried out advantageously at temperatures within the range of from 0° to 120°C, preferably 50° to 100°C. The resin-containing color base solution is also stable at room temperature.

The acid used for the precipitation of the preparation solution, preferably a mineral acid, such as hydrochloric acid, perchloric acid, dilute sulfuric or phosphoric acid (from 2.5 to about 40% strength) or hydrobromic acid, but also aqueous solutions of complex acids, for example $HBF_4$, $HZnCl_3$, $HAlCl_4$, $H_2SnCl_6$ or $H_4Fe(CH)_6$ or similar compounds or organic carboxylic acids, for example formic acid, acetic acid, monochloric acid or trichloroacetic acid, are used in such an amount that the color base as well as the total amount of amine used as solvent is converted into the corresponding salt. A finely dispersed precipitate of the prepared dyestuff salt coated by the resin is thus formed, which can be easily filtered and washed, while the aromatic amine is maintained in solution as a salt and is separated by filtration.

The quantitative ratio of the dyestuff to the resin is advantageously chosen in such a manner that a sufficient fine dispersion is guaranteed with the highest possible tinctorial strength. This varies from dyestuff to dyestuff, but it is, in general, in an amount of from 10 to 70%, preferably from about 20 to 50%, of resin, calculated on the weight of the dry pigment preparation.

The products obtained in accordance with the invention are to be dried at temperatures within the range of from 40° to 120°C, preferably from 60° to 90°C, while care must be taken that the drying temperature does not in any case exceed the softening or melting point of the resin used to prevent sintering of the pigment preparations.

The pigments obtained in accordance with the present invention are distinguished by a very high tinctorial strength, clear shades and excellent properties of use. They can easily be dispersed in printing varnishes, they have soft grains and therefore produce homogenous prints without dots. Furthermore, they have excellent properties in the preparation of brightened black printing inks on a soot basis.

As they have considerable advantages in comparison to the blue and green dyestuffs so far used, because of their simple manufacturing method which makes following operations unnecessary, these products represent a valuable contribution to the printing dyestuffs and an important technical progress.

The following examples illustrate the invention, the temperatures being expressed in degrees Celsius and the parts and percentages being by weight unless stated otherwise.

EXAMPLE 1

50 Parts of dimerized balsam resin were added at 50°C to a solution of 50 parts of a color base of the formula

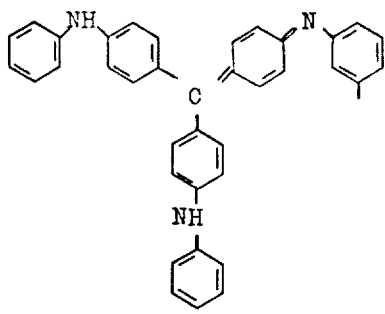

in 200 parts of aniline manufactured by chlorobenzene treatment of the sulfate of the above color base (cf. German Pat. No. 749 217) obtained according to Example 1 of Belgian Pat. No. 718 410, subsequent treatment of the purified dyestuff salt with aqueous sodium hydroxide solution in the presence of aniline and separation of the aqueous-alkaline phase, and stirred until a homogeneous solution was obtained (2 hours). The mixture was cooled to 20°, the aniline solution was introduced dropwise with stirring for 30 minutes in 1500 parts of 20% aqueous acetic acid, the acetate of the above blue color base precipitated in preparated form was suction-filtered, the mixture was washed and dried at 50° - 60° in vacuo. 108 Parts of a blue pigment powder were obtained, which can be easily dispersed in printing varnishes and which produces particularly intense brilliant reddish blue printing inks.

If trichloroacetic acid was used instead of acetic acid, the prepared trichloracetate of the above color base was obtained as a pigment of comparable properties of technical use.

EXAMPLE 2

36 Parts of para-rosaniline were heated at 175° in the presence of 0.6 part of benzoic acid for 150 minutes together with 250 parts of aniline. An aniline solution of a blue color base was obtained which had the following formula:

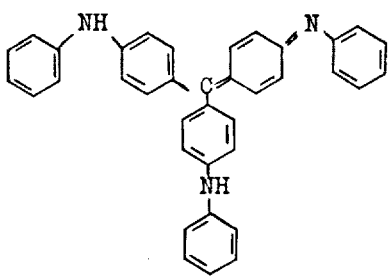

After cooling to 100° 35 parts of a slightly polar synthetic hydrocarbon resin were added to this solution, which dissolved after stirring several times. After cooling the preparation solution to room temperature it was introduced into 1000 parts of 25% fluoboric acid cooled to 5° while stirring vigorously, stirring was continued for 3 minutes, the tetrafluoborate of the above color base coated with the resin used was suction-filtered, the solution was washed until neutral and it was dried at 70 – 80° in vacuo until constant weight was obtained. 98 to 102 parts of a pigment preparation were obtained which produces intense brilliant blue prints, after having been easily dispersed in printing varnishes of the most different types, and which may also be used with great advantage of the manufacture of brightened black printing inks on a soot basis. If aniline was replaced by vic. m-xylidine in the manufacture of the blue color base and the process was carried out as described above, a violet pigment of similar properties was obtained.

EXAMPLE 3

45 parts of a color base of the formula

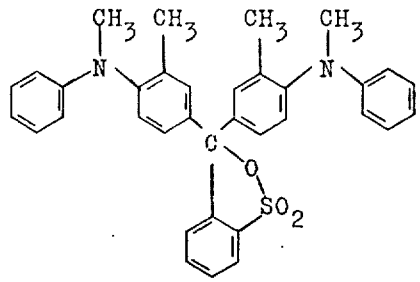

which was manufactured by reaction of o-sulfobenzoic acid anhydride with excess N,2-dimethyl-diphenyl-amine at 120°, stirring of the reaction mixture with 30% aqueous potassium hydroxide solution, separation of the aqueous-alkaline layer and separation by distillation of the volatile components of the organic phase in vacuo at 120° at a maximum, were dissolved at 80° together with 55 parts of an acid natural resin acid partially esterified with glycerol and pentaerythritol in 350 parts of 5,6-dichloro-2-amino-toluene. After cooling to 30° this solution was slowly introduced into 15% aqueous zinc chloride solution (2500 parts) cooled to 0° with stirring to which 350 parts of concentrated hydrochloric acid were added, the mixture was further stirred for 20 minutes and the resin-prepared inner salt of the above color base was isolated by filtration. After washing until the mixture became neutral and drying at 40° – 50° in vacuo 100 parts of a turquoise blue pigment was obtained which can easily be worked into printing varnishes and produces intense brilliant prints.

If sulfuric acid or phosphoric acid of 25% strength was used instead of zinc hydrochloric acid, the same dyestuff was obtained.

If corresponding amounts of N-methyl-carbazole were used instead of N,2-dimethyl-diphenyl-amine a pigment preparation of similar properties was obtained.

The manufacture of the above-used resin was effected according to the following method:

1000 Parts of balm resin, 14 parts of glycerol and 16 parts of pentaerythritol were stirred at 200° for 1 hour while introducing carbonic acid, heated at 250° for 2 hours and maintained at 260° for 3 hours after the addition of 0.5 part of calcium acetate. A resin was obtained having a melting point of 73° (acid number 111). Corresponding results were obtained if as preparation agent a resin was used which was prepared in the following manner:

200 parts of styrene were added to 1000 parts of molten balsam resin, 10 parts of boron trifluoride-dimethyletherate were added dropwise at 120° for 1 hour with stirring, stirring was continued for 2 hours, the temperature was increased to 135° in 1 hour, the mixture was heated at 200° in a slight vacuum and further stirred at 250° and under a pressure of 30 – 50 millimeters of mercury for 1 hour. 1115 parts of resin were obtained having a melting point of 65° (acid number 100).

EXAMPLE 4

320 parts of a 25% m-toluidine solution of the following color base

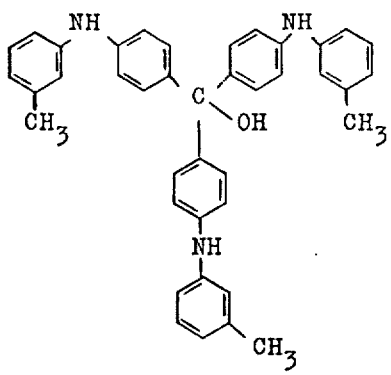

manufactured according to German Pat. No. 1,098,652, Examples 7 and 8, by the reaction of 4,4',-4''-trichlorotrityltetrachloroaluminate with m-toluidine, treatment of the final dyestuff melt with aqueous sodium hydroxide solution and separation of the alkaline phase (cf. Belgian Pat. No. 718,410, Example 2) were stirred at 20° with 20 parts of an acid acrylic resin until the mixture was completely dissolved (1 hour). Then the solution was introduced into 1500 parts of aqueous hydrochloric acid of 10% strength at room temperature while vigorously stirring, stirring was continued for 10 minutes, the mixture was suction-filtered, washed until neutral and the resin-prepared hydrochloride of the above blue color base was dried at 90° – 100° in vacuo. 104 to 107 parts of a blue pigment powder were obtained, which is extremely suitable for use in the graphic industry. The greenish blue and black printing inks prepared with this pigment powder have an extremely high tinctorial abundant strength and brilliance.

If perchloric acid was used instead of hydrochloric acid, 108 to 110 parts of a greenish blue pigment having comparable properties were obtained.

The acid acrylic resin used was manufactured by reaction of 1000 parts of tall resin with 150 parts of acrylic acid at 200°. After 150 minutes it was partially esterified with 80% of glycerol at 250° during 3 hours. 1140 parts of acid acrylic resin were obtained which had a melting point of 118° (acid number 103).

EXAMPLE 5

35 parts of rosaniline and 350 parts of o-toluidine were heated at 180° for 210 minutes, after the addition of 1 part of benzoic acid. There resulted the o-toluidine solution of a color base of the formula

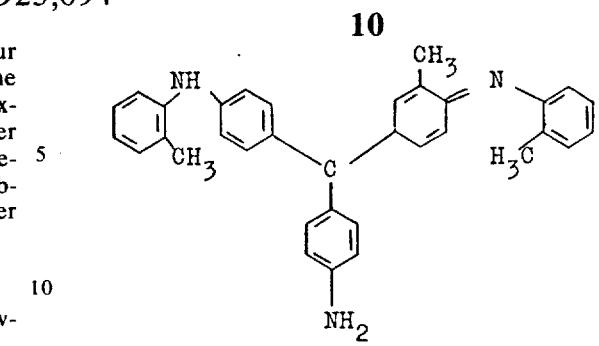

in which 42 parts of a non-polar synthetic hydrocarbon resin were dissolved at 120°. After cooling at 0° the o-toluidine solution of the preparation mixture was added dropwise in 1200 parts of 30% aqueous formic acid cooled at 0° while stirring (75 to 90 minutes), stirring was continued at 0° for 20 minutes, the mixture was filtered, washed until neutral and dried at 75° in vacuo. The pigment obtained (103 parts) represents the resin preparation of the violet base of the above formula and is particularly suitable for the manufacture of deep black, brilliant printing inks on the soot basis.

If the pigment is used alone, clear violet printing inks of high tinctorial strength were obtained.

If the o-toluidine was replaced by o-chloraniline in the rosaniline melt and the process was carried out as indicated above, a slightly bluish pigment was obtained.

EXAMPLE 6

25 parts of a resin-modified acid phenol resin were added to a solution of 75 parts of a carbinol base of the formula

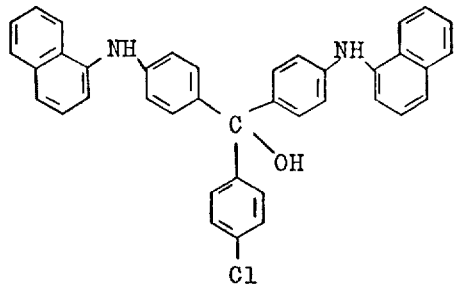

in 165 parts of aniline which was manufactured by treating the hydrochloride of the above formula prepared according to German Pat. No. 1,161,371, Example 2, with aqueous potassium hydroxide solution in the presence of aniline and separation of the aqueous alkaline phase. After having dissolved the resin component (at 10° for 2 hours, at 50° for 20 minutes) the aniline solution cooled at 15° was introduced into 25% aqueous hydroferrocyanic acid (850 parts), stirring was continued at 15° – 20° for 60 minutes, the mixture was suction-filtered and dried at 50° – 55° in vacuo after being washed until neutral. 120 to 125 parts of the prepared ferrocyanide of the color base of the above formula were obtained as green-blue pigment powder which is particularly suitable for the manufacture of colored printing products, particularly for the shading of either blue printing inks, because of its brilliant shade, for example of the inks in accordance with the invention.

The manufacture of the adducts of resin acid phenol used was carried out in such a manner that 100 parts of phenol and xylene each were added to 1000 parts of balsam resin in the melt, 7 parts of boron trifluoride-dimethyl etherate were added at 110° and that the mixture was condensed after 2 hours at 120° for 2 hours. Then, 300 parts of xylene, 150 parts of water and 20 parts of a saturated sodium chloride solution were added, the aqueous layer was taken off at 95° and the xylene layer was distilled off at 200°.

1000 parts of phenol resin were obtained which had a melting point of 100°C, and an acid number of 126. It can be used for the pigment preparation as such or it can be modified previously in the following way:

It is added to natural resin acids heated at 100° – 180° and condensed at this temperature for several hours.

Another processing method consists in condensing the natural resin acids together with the phenols, the aldehydes and the catalysts (cf. German Pat. Nos. 254,411; 269,959; 281,939).

EXAMPLE 7

10 parts of aldehyde-modified acid natural resin were added to a solution of 90 parts of a color base of the formula

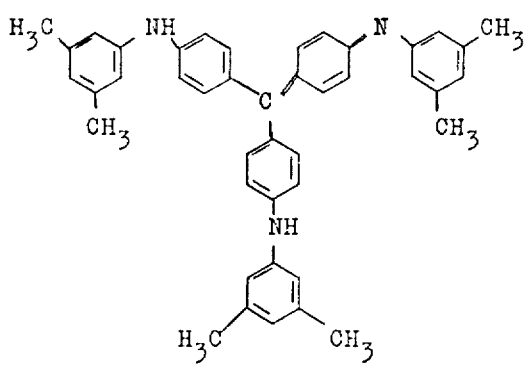

in 250 parts of 3-chloraniline, which was manufactured from the dyestuff hydrochloride obtained according to German Pat. No. 1,093,652, Example 12, by a treatment of its 3-chloraniline suspension with potassium carbonate and separation of the potassium chloride so obtained by filtration at 120°, the acid natural resin being dissolved at 120° in the dyestuff solution. The mixture was cooled to 25° and the stable preparation mixture was added dropwise to 3000 parts of 10% sulfuric acid at room temperature during 75 minutes while stirring. After suction-filtration, washing and drying at 75° – 80° in vacuo 103 parts of a blue pigment preparation were obtained which contained the resin-coated sulfate of the above blue color base. After easily effected dispersion in printing varnishes containing, if desired, soot blue and black printing products were obtained which had an extremely high tinctorial strength.

If corresponding amounts of 3- or 4-aminobenzoic acid ethyl ester were used instead of the symmetrical m-xylidine reacted in the dyestuff used (according to German Pat. No. 1,098,652, Example 15) and if the process was carried out in analogous manner as described above dyestuff sulfate preparations having similar shades and properties were obtained.

The manufacture of the resin used for these preparations may be carried out for example by the addition reaction of 14.4 parts of 96% formaldehyde with 272 parts of colophonium at 120°. The resin obtained had a melting point of 120° and an acid number of 125.

EXAMPLE 8

72.5 parts of carbinol base of the formula

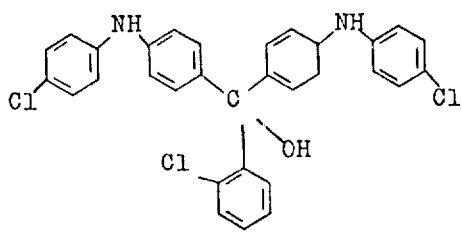

were dissolved together with 27.5 parts of disproportioned resin acid in 300 parts of 5-chloro-2-aminotoluene at 30°C while stirring and the solution was cooled at 30°. Subsequently it was added dropwise to a solution of 500 parts of monochloroacetic acid cooled at −5° in 3000 parts of water while stirring with a turbine (15 minutes), stirring was continued for 15 minutes with half the number of revolutions and a resin preparation of the chloroacetate of the color base used was obtained which could be easily filtered and washed. After isolation and drying in vacuo at 60° – 65°, 105 to 108 parts of pigment powder were obtained which were suitable for the manufacture of green printing dyestuffs, particularly for the shading of blue printing pigments, for example those in accordance with the invention.

The carbinol base of this dyestuff can be maintained if 2-chlorobenzotrichloride or -benzoyl chloride was reacted with 4-chloro-diphenyl-amine in excess at 90° – 110° in the presence of zinc chloride or aluminum chloride, the final melt was stirred after dilution with chlorobenzene with 30% potassium hydroxide solution and the chlorobenzene phase was distilled in vacuo until it became dry.

EXAMPLE 9

65 parts of a color base of the formula

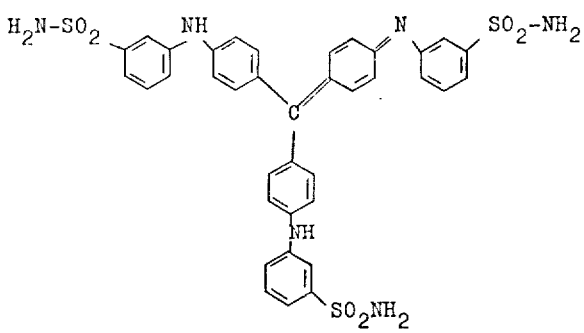

obtained by reaction of the hydrochloride of the above formula manufactured according to German Pat. No. 1,098,652, Example 20 with aqueous sodium hydroxide solution in the presence of 3-toluidine, separation of the aqueous-alkaline layer and distillation of the toluidine phase at 150° in vacuo until it became dry, were dissolved with 35 parts of a synthetic hydrocarbon resin in 180 parts of aniline at 30° and then introduced in 800 parts of 35% aqueous phosphoric acid while stirring thoroughly. After filtration, washing until neutral and drying at 85° - 95°, 103 to 107 parts of a blue pigment powder were obtained which was very suitable for the manufacture of brilliant blue printing inks and for the brightening of printing soots. If one of the resin-modified phenol resins described in Example 6 was used instead of the synthetic hydrocarbon resin a pigment powder was obtained which had comparable properties for the technical use.

EXAMPLE 10

60 parts of the blue color base mentioned in Example 7 (anhydro-4,4',4''-tris-(3,5-dimethyl-phenylamino)-triphenylcarbinol), 15 parts of the sulfone of the 4,4'-bis-(N-methylphenylamino)-3,3'-dimethyl-triphenyl-carbinol-2''-sulphonic acid used in Example 3 and 25 parts of a mixture of 10 parts of balsam resin and of 15 parts of disproportioned natural resin acid were dissolved in 175 parts of aniline heated at 50° while stirring. Then the mixture was precipitated by introducing it in 2000 parts of 75% aqueous trichloroacetic acid of −5°, stirring was continued for 35 minutes, the mixture was filtered, washed until neutral and dried at 55° - 60° in vacuo. 108 to 110 parts of a printing pigment were obtained which contained the trichloroacetate of the blue color base used in Example 7 in admixture with the inner salt of the color base mentioned in Example 3 in resined, finely dispersed form.

This preparation had exactly the same shade as the normal blue of the trichromatic print and may be used with great advantage for this purpose because of its excellent properties with regard to printing technique.

EXAMPLE 11

A solution of 77.5 parts of a color base of the formula

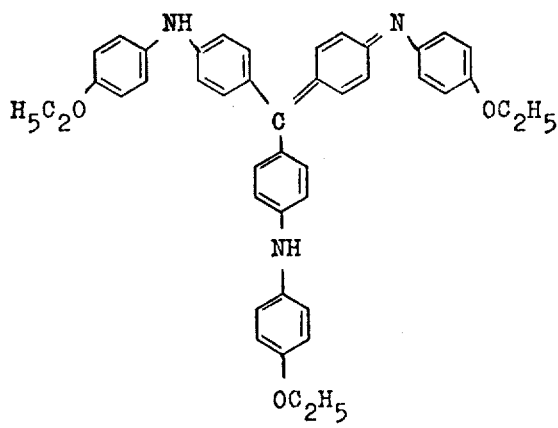

in 275 parts of p-phenetidine was obtained by treating a dyestuff melt manufactured according to German Patent No. 1,098,652, Example 10, with aqueous potassium hydroxide solution and subsequent discarding the aqueous phase. 22.5 Parts of the acid acrylic resin as described in Example 4 were dissolved in it at 65° and this mixture was added dropwise to 1500 parts of 8.5% hydrochloric acid cooled at 0°. The prepared hydrochloride at the color base used was precipitated in finely dispersed form which could be easily filtered, it was suction-filtered, washed with water until neutral and subsequently dried at 95° - 100° in vacuo. 107 Parts of blue pigment powder were obtained which was very suitable for the manufacture of very yielding, valuable blue and above all black printing inks for technical use.

If a corresponding amount of hydrobromic acid was used instead of the hydrochloric acid used for precipitation the resined hydrobromide of the above blue color base (114 - 116 parts) was obtained.

EXAMPLE 12

A mixture of 40 parts of the 4,4',4''-tris-(m-tolylamino)-triphenyl-carbinol used in Example 4, 10 parts of the 4,4'-bis-(p-chloro-phenylamino)-2''-chloro-triphenyl-carbinol used in Example 8 and 50 parts of levopimaric acid was dissolved at room temperature in 210 parts of m-toluidine. The mixture was introduced with stirring in 1750 parts of 15% aqueous acetic acid of 0° for 60 minutes, was suction-filtered, washed until neutral and dried at 40° - 45° in vacuo. The resin-prepared mixture thus obtained of the acetates of the above carbinol basis can be easily dispersed in printing varnishes to yield clear, greenish blue printing inks of high tinctorial strength.

We claim:

1. A process for making a pigment composition consisting essentially of resins and triphenyl-methane dyestuffs which comprises preparing a solution in an organic amine which is liquid below 50°C. of an acid-precipitatable resin and a tri-phenylmethane dyestuff of the general formula

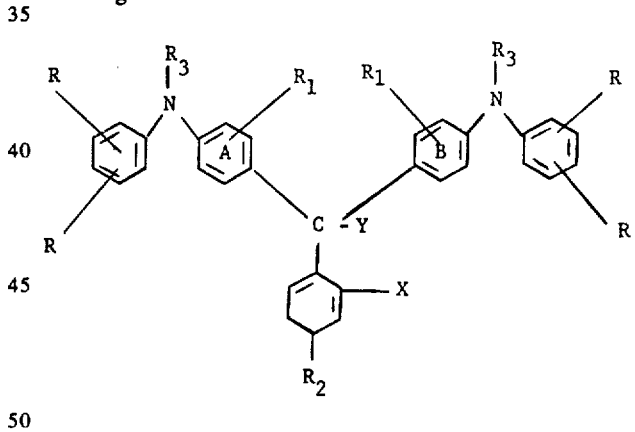

in which

R is hydrogen, chlorine, bromine, alkyl, alkoxy, cyano, carboxylic acid ester, carboxamido, nitro, amino, alkyl-amino, phenylamino, acylamino, substituted phenyl, phenyl or sulfon-amido and two radicals, R in o-position may form together a condensed phenyl ring, $R_1$ is hydrogen, methyl or ethyl, and $R_1$ may be directly bonded to a radical R, $R_2$ is hydrogen, chlorine, bromine, amino, phenylamino, or naphthylamino which may be substituted by one or two radicals which have the meaning of R, $R_3$ is hydrogen, methyl or ethyl, X is hydrogen, chlorine, bromine or a radical —$SO_3H$ or —COOH Y is hydroxy,
and X and Y together may be a —SO₂O or —CO—O group and one of the radicals R₃ and Y may also be directly bonded with the ring A or B, one ring being a quinonoidal system, mixing the resulting solution with an aqueous solution of an acid at a temperature between about −10° and +50°C. to precipitate resin-dyestuff particles and recovering the precipitated particles.

2. A process as claimed in claim 1 wherein as resins natural resin acids, their oxidized, hydrogenated, dimerized or disproportioned derivatives or synthetic resins, acid resin esters, aldehyde-modified resins, maleinate resins and compounds obtained by the reaction of dienes with resins, phenyl-modified resins, products obtained by the addition reaction of resins with hydrocarbons containing double bonds, condensation products of resins and phenol-formaldehyde-condensates, resin condensates with xylene-formaldehyde-resins, reaction products from resins and terpene-maleinate resins or mixtures of these resins are used.

3. A particulate pigment composition made by the process of claim 1.

4. A particulate pigment composition made by the process of claim 2.

5. A process according to claim 1 wherein the organic amine is an aromatic amine.

* * * * *